Nov. 8, 1966 W. H. HAWKINS 3,283,699
PRESSES
Filed Feb. 17, 1965
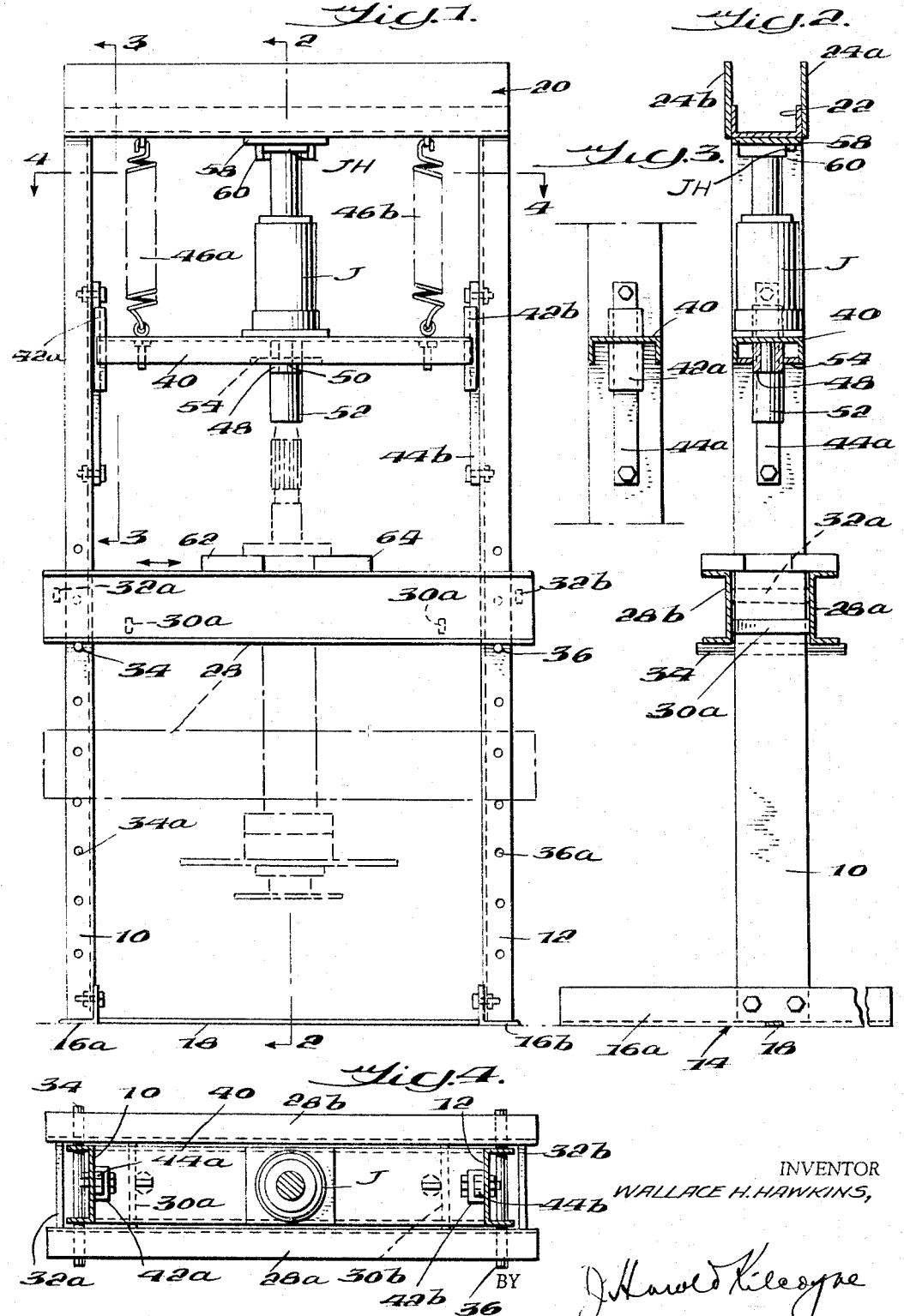
INVENTOR
WALLACE H. HAWKINS,
BY J. Harold Kilgore
ATTORNEY

United States Patent Office 3,283,699
Patented Nov. 8, 1966

3,283,699
PRESSES
Wallace Hampton Hawkins, Panama City, Fla., assignor to Red Arrow Products, Inc., Leon, Fla., a corporation of Florida
Filed Feb. 17, 1965, Ser. No. 433,295
7 Claims. (Cl. 100—214)

This invention relates to improvements in presses, and more particularly in presses for use in removing bearings from and replacing them on the rear axles of automotive vehicles.

Among the major objects of the invention may be noted the provision of a press as aforesaid which while designed particularly for heavy duty service, i.e. that of pulling bearings from and/or replacing them on the rear axles of tractors, large cargo trucks, and like service vehicles, is also well suited to the pulling and replacement of bearings of the makes and sizes which are presently used in passenger vehicles, including compacts, small trucks such as pick-up trucks, and the like; and the provision of a bearing removing and replacing press capable of universal service as aforesaid which is characterized by simple design and rugged and durable construction, and which is moreover thoroughly dependable in operation.

The above and other objects and advantages of a bearing pulling and replacing press according to the invention will appear from the following detained description of a preferred physical embodiment thereof shown in the accompanying drawing, wherein:

FIG. 1 is a front elevation of said press shown to be set up to remove the bearing from the rear axle of a service vehicle such as a tractor, through use of an axle adapter shown in broken lines, the view also indicating in broken lines the adjustable height feature of the supporting bed;

FIG. 2 is a vertical section taken through said press on line 2—2 of FIG. 1; and FIGS. 3 and 4 are sections taken on lines 3—3 and 4—4, respectively, of FIG. 1.

Referring to the drawings, a bearing pulling and replacing press according to the invention illustratively comprises fixed uprights 10, 12 in the form of structural members having outwardly-facing channel section and which are secured in spaced-apart and parallel relation by a supporting base generally designated 14 and by a top beam 20. Said base is shown to be fashioned from two front-to-rear extending angle irons 16a, 16b to whose mid-portions are bolted the lower ends of said uprights and which are maintained in properly spaced relation to one another by a cross bar 18. By reference to FIG. 2, said top beam 20 comprises an upwardly facing channel iron 22 reinforced with front and rear side plates 24a, 24b welded to the side flanges thereof.

A vertically adjustable horizontal bed 28 having length somewhat greater than the outer-line distance between the uprights 10, 12 is supported by said uprights in position as to extend therebetween. More particularly, said bed comprises two beams 28a, 28b of channel section secured together in back-to-back but spaced-apart relation by inner and outer pairs of connecting bars 30a, 30b and 32a, 32b, respectively, which effect spacing of said beams a distance slightly in excess of the width dimension of said uprights. Accordingly, the bed 28 as a unit may move up and down along the uprights since the latter are accommodated in the space between the backs of the beams 28a, 28b making up said bed. Illustratively, the bed-supporting means comprises the pins 34, 36 on which the ends of the beams making up said bed normally rest, the pins extending front to rear through selected horizontally aligned pairs of holes 34a, 36a provided in the side flanges of the channel-form uprights. There being a plurality of such pin-receiving holes disposed in vertical series and spaced apart from one another in 4" centers (approximately), it will be seen that the height position of the horizontal bed may be changed at will simply by shifting the pins from hole to hole of the vertical series thereof as may be necessary to establish a desired height position of said bed.

Extending between the uprights and being disposed intermediate the top beam 20 and the bed 28 is a horizontally disposed carriage 40 of length slightly less than the spacing between the facing sides of the uprights 10, 12 so as to be operable in the plane of the latter. The carriage ends rigidly mount the elongate vertically disposed, outwardly facing guide channels 42a, 42b which slidably embrace the vertical guide tracks 44a, 44b rigidly secured in vertical position to said facing sides of said uprights. As best seen in FIG. 3, said guide channels and guide tracks are disposed symmetrically with respect to the vertical center plane passing through the carriage and uprights, and preferably also said guide channels are fixed at their approximate mid points to the carriage ends so as to extend both above and below the general horizontal plane of the carriage. A pair of tension springs 46a, 46b, whose ends are secured as by eye bolts to the under side of the top beam 20 and the upper side of said carriage 40, respectively, serve to maintain the carriage in its normal raised position, but it may be lowered against the tension of said springs, and during its lowering movement it is guided by the coaction of its guide channels with the vertical tracks 44a, 44b.

The carriage 40 mounts centrally thereof and on its under side a downwardly facing socket-type chuck 48, such by reference to FIG. 2 having the form of a vertically disposed collar whose hole or bore opens downwardly and is provided in its lower-end portion with a tapped set-screw opening for the reception of a set screw 50. By this arrangement a desired size of punch 52 may be removably secured in the chuck. In the event that the carriage has downwardly opening channel construction as shown, it may be reinforced in its central portion which mounts said chuck by a welded-in reinforcing plate 54 through which the chuck projects.

The vertically slidable carriage 40 is adapted to mount a preferably manually actuable, self-contained hydraulic lifting jack J thereon. In order to center the jack with respect to the aforesaid chuck 48 and punch 52 secured therein, the top beam 20 is provided on its under side with so-called jack head guide means adapted to receive the jack head JH when the latter is properly cooperated therewith. Said guide means preferably comprises a rectangular plate 58 secured as by welding to the under face of the top beam mid-way along the length thereof, and which in turn mounts on its geometric center a strap 60 secured on edge thereto, said strap being bent to semi-circular form so as to define a forwardly opening recess closely fitted to said jack head JH. Thus, the jack may be properly placed and centered by holding the carriage 40 depressed by an amount as permits the jack held vertical as normal to be slid rearwardly until its head JH seats in the recess, whereupon the carriage is permitted to move upwardly against the jack base under the bias of the springs 46a, 46b, which by design is such as supports the weight of said jack.

In order to support either an axle proper or an adapter attached thereto or to the bearing to be pulled on the vertically adjustable bed 28, which it will be remembered is comprised by two spaced-apart beams 28a, 28b, two support plates 62, 64 are provided, such being of depth that when resting on the top horizontal flanges of said beams they will bridge the space between same. The adjacent edges of said support plates may be complementally recessed so as to provide an opening for the axle or body of the adapter for which said beams constitute the supporting bed and said plates provide a fixed supporting surface thereon. So too, one of said plates, illustratively that numbered 64, may be secured in a fixed position on said supporting bed, the other plate 62 then being movable laterally toward and away from the fixed plate as may be necessary for said plates in concert with the spaced beams to provide a fixed abutment surface.

In the use of the above described press in removing or pulling a bearing from a rear axle, the bearing or the adapter secured about the same is supported in resting position on the bed 28 via the aforesaid companion support plates 62, 64, the axle alone or with the adapter then having a portion projecting upwardly therefrom on the axis of the chuck 48 and its major portion depending downwardly through the space between the beams making up said bed, the vertical position of the bed being of course adjusted to provide adequate space below same to receive said major depending portion. Assuming the jack J to have been mounted in properly centered position, the jack handle (not shown) is pumped, as results the jack being extended axially downwardly relative to the top beam 20, such in turn forcing the carriage 40 downwardly and thereby also moving the chuck-carried punch 52 downwardly against said upper end portion of the axle. Continued pumping of the jack handle will then force the axle downwardly through the bearing or adapter enclosing same, which is then being held stationary from below by said companion support plates 62, 64, as results in the bearing being "pulled" in manner well known in the art.

When the press is to replace a bearing, the bearing or the adapter enclosing same is placed on said plates 62, 64 and the axle then disposed fully above same is forced downwardly through said bearing. Since the supporting bed 28 may be lowered almost to the base 14, ample space is provided for positioning of the axle above the bearing. Thus the press may be used to pull and replace bearings without requiring removal of the jack from its illustrated position and its repositioning below the supporting bed 28.

Without further analysis, it well be appreciated that a press of the invention is suited to the pulling of bearings from and replacing them on axles of the whole range of axle and bearing sizes which are used not only in passenger vehicle, including compacts (the latter through the use of suitable adapters) but also in heavy duty trucks and tractors, for example. Although of simple design, the herein press is ruggedly constructed, and in actual practice it has given thoroughly dependable service, since it is a feature of the invention that, regardless of bearing and/or axle size, the carriage must move vertically, consequent to the action of the guide channels 42a, 42b and vertical guide tracks 44a, 44b in insuring only true vertical movement of said carriage. Since the chuck 48 is fixed to the carriage on the vertical center line thereof, the chuck and the punch 52 positively held therein by the set screw 50 must also move vertically. Thus, extension of the jack always results in said punch held in the chuck exerting its force on the workpiece in true vertical direction, since no cocking or misalignment of said punch is possible.

Another noteworthy feature of the press of the invention is the ability to change from one size of punch to another, as required for a particular job, always with assurance that the punch being used at any one time will be securely held to the chuck. This relieves the operator of any worry on the score of the punch flying loose when full pressure is applied thereto by the jack. Of course, it should be understood that where punch is used herein in reference to the tool secured to the chuck such is intended to mean other jack-operated tools as well.

Again, the herein press is also notable for the ease with which it may be set up for use for any particular job it may be called upon to perform, and similarly for the ease with which its set-up may be changed from job to job. As a matter of fact, all that is necessary to prepare the press for a particular operation is to set the bed 28 at the proper elevation to take the workpiece, since the springs 46a, 46b acting on the carriage 40 will always effect retraction of the jack J to its ready-for-use length.

However, as many changes could be made in carrying out the above constructions without departing from the scope of the invention, its is intended that all matter contained in the above description or shown in the accompanying drawing shall be interpreted as illustrative and not in a limiting sense.

I claim:

1. A press of the character described comprising, in combination: a pair of spaced-apart upright members, a top cross beam extending between and rigidly affixed to the upper ends of said uprights, a workpiece supporting bed extending transversely of said upright members and being supported thereby at an elevation intermediate the length thereof, a vertically movable carriage extending transversely between said uprights at an elevation intermediate that of the top beam and the supporting bed, said carriage having length substantially equal to the spacing between the facing sides of the uprights whereby to be operable in the plane of said uprights, coacting guide means on the ends of said carriage and on said facing sides of the uprights and being disposed symmetrically with respect to the vertical center plane passing through said carriage and uprights for guiding said carriage throughout its vertical movement, spring means biasing said carriage to a normal raised position, power means interposed between the carriage and top beam and reactive against the latter for forcefully actuating said carriage in downward direction, chuck means affixed to and depending from said carriage, and a punch removably secured in said chuck means and projecting downwardly therefrom towards said support bed for engagement with a workpiece supported on said bed, said power means, said chuck means and punch being vertically aligned and being disposed on the vertical center line of the press.

2. A press according to claim 1, wherein said power means comprises a manually actuable jack removably mounted between said top beam and carriage and being held in operative position by the biasing action of said spring means on said carriage.

3. A press according to claim 1, wherein said upright members carry adjustable height support means for said supporting bed whereby the elevation thereof may be varied according to the workpiece and/or the type of operation to be performed thereon.

4. A press according to claim 1, wherein said upright members are each provided with a plurality of holes disposed in vertical series for the reception of a pin, and each mounts a projecting pin seated in a hole, said pins providing support means for said bed and said holes and pins together providing means for varying the height position of said bed.

5. A press according to claim 1, wherein said spring means comprises a pair of coil springs disposed symmetrically to the sides of the press center line and whose ends are secured to the top beam and carriage, respectively.

6. A press according to claim 1, wherein said coacting guide means comprises vertically disposed, outwardly facing guide channels affixed to the ends of the carriage and vertically disposed tracks secured to the inner faces of the uprights and which are slidably embraced by said guide channels.

7. A press according to claim 6, wherein the guide channels are substantially longer than the height dimension of the carriage and are affixed to the ends of the carriage at points intermediate their ends, whereby the channels extend both above and below the plane of the carriage.

(References on following page)

References Cited by the Examiner

UNITED STATES PATENTS

| | | | |
|---|---|---|---|
| 633,665 | 9/1899 | Spaulding | 100—266 X |
| 1,182,023 | 5/1916 | McGregor | 100—214 X |
| 1,755,403 | 4/1930 | Manley. | |
| 2,267,662 | 12/1941 | Miller | 100—266 |
| 2,387,839 | 10/1945 | Frost | 100—266 |
| 2,502,072 | 3/1950 | Bender. | |
| 2,742,853 | 4/1956 | Knelson | 100—266 X |
| 3,115,824 | 12/1963 | Longfield | 100—214 |

WALTER A. SCHEEL, *Primary Examiner*.

BILLY J. WILHITE, *Examiner*.